United States Patent [19]
Krampitz

[11] Patent Number: 5,324,232
[45] Date of Patent: Jun. 28, 1994

[54] PERMANENT-MAGNET FRONT OR CONTROL COUPLING TO TRANSFER MEASURED VALUES, FORCES OR TORQUES

[75] Inventor: Herbert Krampitz, Potsdam, Fed. Rep. of Germany

[73] Assignee: Daniel Industries, Inc., Houston, Tex.

[21] Appl. No.: 966,020

[22] Filed: Oct. 23, 1992

[30] Foreign Application Priority Data

Nov. 22, 1991 [DE] Fed. Rep. of Germany ....... 4140445

[51] Int. Cl.$^5$ .................... H02K 49/10; G01D 5/06; G01F 1/05; G01F 3/02
[52] U.S. Cl. .................................................. 464/29
[58] Field of Search ................................ 464/29, 160

[56] References Cited

U.S. PATENT DOCUMENTS

| | | | |
|---|---|---|---|
| 2,481,360 | 9/1949 | Sprenger | 464/29 X |
| 3,221,389 | 12/1965 | Cowell | 464/29 X |
| 4,095,426 | 6/1978 | Rhodes | 464/29 X |
| 4,152,099 | 5/1979 | Bingler | 464/29 X |
| 4,767,378 | 8/1988 | Obermann | 464/29 |
| 4,836,826 | 6/1989 | Carter | 464/29 |
| 5,045,026 | 9/1991 | Buse | 464/29 |
| 5,215,501 | 6/1993 | Ushikoshi | 464/29 X |

FOREIGN PATENT DOCUMENTS 0010887 1/1980 Japan ..................... 464/29

*Primary Examiner*—Clifford D. Crowder
*Assistant Examiner*—John J. Calvert
*Attorney, Agent, or Firm*—Alton W. Payne; David M. O'Brian

[57] ABSTRACT

The invention concerns a permanent magnet front or central coupling unit that generally works through a watt to transfer measured values and torque in units that may, for example, be used in the volume gauge technology. In accordance with the task, the permanent magnet coupling shall be designed so that its transferable maximum torque is not present in the starting state and that it thus exhibits vibration-damping properties. In accordance with the invention, this is achieved by the fact that one or several permanent magnets are arranged in a fixed manner and that the poles are located such that they produce repulsive forces in their effective direction, i.e., the respective opposite magnet poles are of equal denomination. In the stationary state, the magnet poles thus occupy the greatest possible distance from each other, resulting in the lowest possible transferable torque. As a function of the required load, the coupling halves begin to rotate and the transferable torque increases to the required value. The coupling thus exhibits vibration-damping properties.

6 Claims, 1 Drawing Sheet

PERMANENT-MAGNET FRONT OR CONTROL COUPLING TO TRANSFER MEASURED VALUES, FORCES OR TORQUES

SUMMARY OF THE INVENTION

The invention concerns a permanent-magnetic front or control coupling that functions as a measured-value or torque transfer unit, e.g., in volume gauges, and works through a wan.

In volume gauges for fluids, the rotary motion of the measuring units, e.g., the rotary motion of oval wheels in oval-wheel flowmeters as well as the rotary motion of impellers in Wolman or impeller meters is transferred by means of a permanent-magnet coupling through a wall from the wet to the dry volume. Permanent-magnet front couplings are generally used for small torques, while permanent-magnet central couplings are used for large torques.

Front couplings required little space and are economical to manufacture. Their disadvantage consists in the relatively high axial force of attraction at the coupling point and, associated with it, in the high bearing friction and wear. For that reason, front couplings are designed with tight tolerances to keep wear to a minimum. Larger changes in the flow conditions, i.e., accelerations at the impeller or switching phases in the indicator module may easily cause a break in the front coupling.

Central couplings are generally used for oval-wheel flowmeters, since they are capable of transferring the required large torques without producing high bearing forces. Central couplings are expensive to manufacture and have a large mass.

The geometry of the oval wheel yields two acceleration and two deceleration phases for each rotation of the oval wheel at a constant medium throughflow. With a higher throughflow, the rpm of the oval wheels increases accordingly, thus causing an increase in the acceleration and deceleration.

A substantial disadvantage of the known couplings consists in the fact that their largest torque value to be transferred occurs in their starting position and that the above-mentioned accelerations and decelerations are in a non-damped manner transferred to the downstream measured-value transfer system, thus causing high wear at the force-transfer units. Particularly in central couplings that have a large mass, it is possible that the required drive torque cannot be produced, since the coupling breaks and produces erroneous measurements as well as vibrations in the above-mentioned downstream units.

It is thus the task of the invention to develop a permanent-magnet front or central coupling, whose maximum torque to be transferred does not occur in the starting position and that exhibits vibration-damping properties, thus preventing a break in the coupling effect due to the above-mentioned acceleration and deceleration forces. In that regard, it should be possible to manufacture the coupling indicated in this invention at the same or a slightly higher cost.

In contrast to the known permanent-magnet couplings, in which the magnet poles of the coupling halves are arranged in an unlike manner (opposite poles of different denomination), i.e., attraction of magnet poles, the task solved is in accordance with the invention by the fact that the opposite poles in both coupling halves are of the same denomination, i.e., south-south or north-north, thus producing a repulsing force. The magnet poles of the coupling halves thus assume the greatest possible distance from each other, i.e., to the extent that this is allowed by the respective coupling design. Only a very small torque may be transferred in this position. The force effect and thus the transferable torque is increased only by means of a rotation of the two coupling halves with respect to each other. It win be possible to transfer the greatest magnet coupling torque, when the magnet poles occupy the shortest possible distance from each other. The coupling halves only rotate to the point at which the required drive moment has been reached. The distance between the magnet poles and thus the torque that can be transferred change in the event of switching phases, accelerations and load changes.

By means of the magnetic repulsing forces in the coupling halves, the coupling functions as a spring-flexible unit during the torque transfer and is thus capable of compensating for the load peaks without a coupling breakoff and capable of damping the vibrations. The magnetic forces work equally efficiently for clockwise and counterclockwise rotations.

BRIEF DESCRIPTION OF THE DRAWINGS

This invention will be explained in the following in more detail using two design examples; the corresponding drawings show the following.

DETAILED DESCRIPTION OF THE PREFERRED EMBODIMENT

Figure 1:
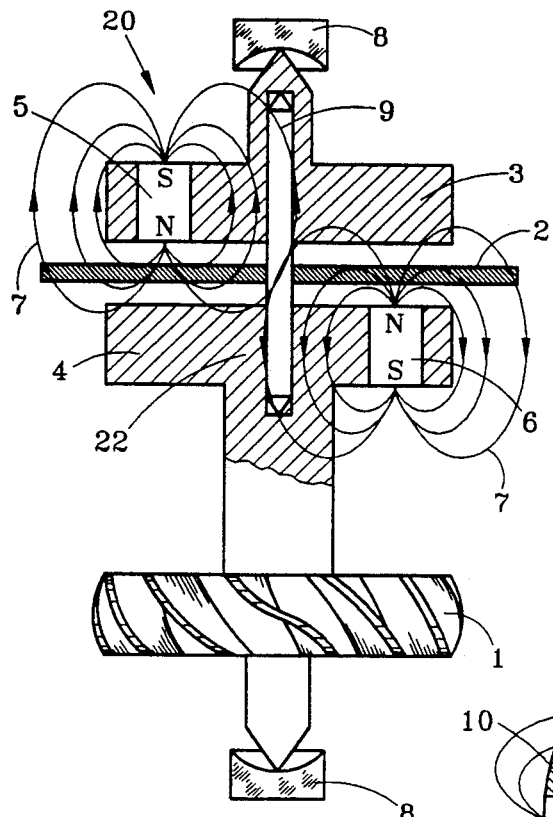
FIG. 1 a front coupling with one permanent magnet in each coupling half, arranged in such a manner that the poles of equal denomination are located opposite each other.

As indicated in FIG. 1, coupling halves 3 and 4 in their stationary state occupy a position, in which the two magnets 5 and 6 are located furthest from each other. The axial limit is provided by axial bearings 8 and the radial limit is ensured by the respective design of coupling halves 3 and 4 and by radial bearing 9.

In this stationary state, the front coupling 20 transfers the smallest possible torque without rotation of coupling halves 3 and 4 with respect to each other.

The space-related position of magnets 5 and 6 and thus the magnetic effects change by means of the angular velocity of measuring impeller 1 and the drive moment at coupling half 3; this phase continues to the point at which the required drive moment is reached.

An important property of the invention consists in the fact that the rotation of coupling halves 3 and 4 occurs only to the point in time at which the required drive moment is reached at coupling half 3. For that reason, the axial forces produced by the repelling forces from magnets 5 and 6 change with the drive moment. In contrast to this, the known front couplings using attraction-force magnets provide the highest possible transferable torque across the whole operating period; this includes a certain torque reserve that will be required in the event of load peaks. This causes high friction and great wear in the bearing of the coupling halves. Furthermore, these couplings tend to break-off sooner, since the load peaks unavoidably cause a certain rotation of the coupling halves, accompanied by an immediate distinct decrease in the transferable torque.

In the front coupling 20 designed in accordance with the invention, the transferable torque is smallest in the stationary state and increases as a function of the load due to the rotation of the two coupling halves 3 and 4 to a maximum value. In that manner, short-term load peaks cause bearing loads that are higher only for short periods. In contrast to the known solutions, it is possible to distinctly increase the torque reserve and this measure does not have a great effect on the bearing load during normal operation. Because their relative rotation is executed as a function of the load, the heavy-mass coupling halves 3 and 4 have a vibration-damping effect.

Figure 2:
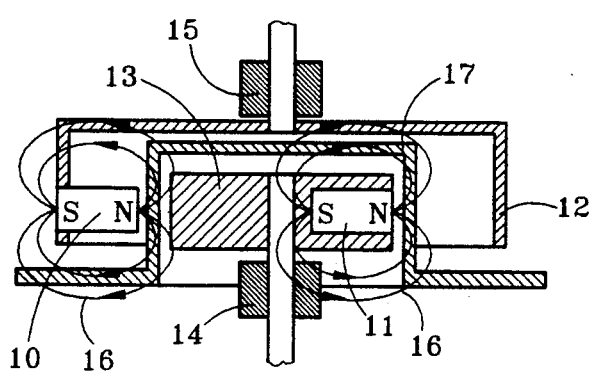
FIG. 2 a central coupling with one permanent magnet of equal denomination in each coupling half, arranged opposite each other.

FIG. 2 shows a further design of the invention, in which magnets 10 and 11 that produce the repulsive forces are arranged in a central coupling generally used in oval-wheel flowmeters. Magnets 10 and 11 of the central coupling are attached in a radial and fixed manner to magnet holders 12 and 13. Magnet holders 12 and 13 begin to rotate with respect to each other due to the repulsive forces produced by magnets 10 and 11; this continues to the point, at which the clockwise or counterclockwise torques have been equalized. This position represents the point at which the smallest possible torque can be transferred in the clockwise as well as in the counterclockwise direction. Angle velocities like those occurring, for example, in the drive phase by means of oval wheels in oval-wheel flowmeters or variations in the drive torques at magnet holder 12 cause a rotation of magnet holders 12 and 13 with respect to each other, thus increasing the transferable torque between the magnet holders. At the above-mentioned acceleration, the central coupling in accordance with invention encounters fewer break-offs than the known designs, because the two magnet holders are working through separation wall 17 by connected means of the magnetic field 16 of magnets 10 and 11, in a spring-flexible manner and because the transferable maximum torque is reached only after a certain degree of rotation. The magnetic fields 16, 7 form a spring-flexible unit 22 which maintains the relationship of the coupling halves 3, 4 and the magnet holders 12, 13 to each other. This achieves in an advantageous manner a very effective damping of the abovementioned acceleration or deceleration caused by the oval wheels; vibrations are thus prevented to a large degree.

Figure 3:
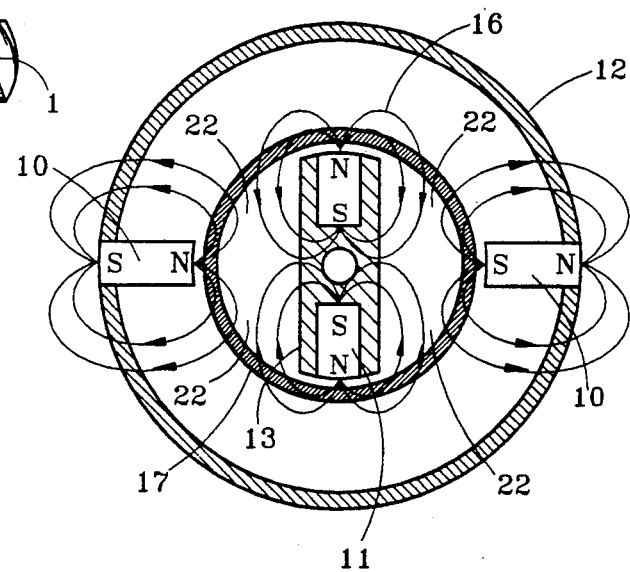
FIG. 3 a top view of a central coupling with two magnetic pole pairs arranged opposite each other with equal denomination in each coupling half.

FIG. 3 shows a top view of a double-pole central coupling, in which permanent magnets 10 and 11 that produce the repulsive forces are arranged in a fixed manner on magnet holders 12 and 13.

It shows that the magnets producing the repulsive forces, attached to drive magnet holder 13, are aligned in the non-load state at an angle of approximately 90° to the magnets of driven magnet holder 12. The transferable torque changes with the number of pole pairs, thus causing a change in the angle, by which the coupling halves 12 and 13 win be able to rotate before the coupling breaks off.

No radial and axial forces are applied to bearings 14 and 15 of magnet holders 12 and 13, because magnets 10 and 11 that produce the repulsive forces are arranged radially and symmetrically on magnet holders 12 and 13.

What is claimed is:

1. An apparatus for transferring a torque from one side of a barrier to an opposite side of the barrier comprising:
   (a) a first coupling having a central axis and a radial extreme extending from the first coupling central axis, said first coupling disposed to rotate about the first coupling central axis,
   (b) a second coupling having a central axis and a radial extreme extending from the second coupling central axis, said second coupling disposed to rotate about the second coupling central axis,
   (c) the barrier separating said first coupling and said second coupling with the central axis of each coupling in registry to form a common longitudinal axis such that said first and second couplings rotate about the common longitudinal axis,
   (d) a first magnet securedly affixed to a radial extreme of said first coupling and having a magnetic field characterized by the existence of a magnetic force and by the existence of two magnetic poles at which the magnetic field is most intense, the poles designated by an approximate geographic direction north and south, to which the first magnet is attracted, said first magnet disposed to locate the first pole in close proximity to said barrier and the second pole remote from said barrier,
   (e) a second magnet securedly affixed to a radial extreme of said second coupling and having a magnetic field characterized by the existence of a magnetic force and by the existence of two magnetic poles at which the magnetic field is most intense, the poles designated by the approximate geographic direction, north and south, to which the second magnet is attracted, said second magnet disposed to locate the first pole in close proximity to said barrier and the second pole remote from said barrier such that poles of equal denomination of each magnet are adjacent said barrier;
   such that the positional relationship of said magnets and a force caused by associated magnetic fields causes said couplings to rotate about the common longitudinal axis for positioning said magnets at the most remote possible position so as to create a stationary phase,
   when a torque is applied to either of the coupling, a magnetic force is created by interaction of the associated magnetic fields which magnetic force creates a repulsion for driving the other coupling to turn about the common longitudinal axis such that the torque is transferred from one coupling to the other coupling through said barrier so as to create a drive phase.

2. The apparatus for transferring a torque from one side of a barrier to the other side of the barrier as defined in claim 1 wherein the stationary phase provides no transferable torque.

3. The apparatus for transferring a torque from one side of a barrier to the other side of the barrier as defined in claim 1 wherein the drive phase provides transferable torque which increases as a function of the magnetic force created by the interaction of the associated magnetic fields.

4. The apparatus for transferring a torque from one side of a barrier to the other side of the barrier as defined in claim 3 wherein the transferable torque creates angular movement of said other coupling about the common longitudinal axis.

5. The apparatus for transferring a torque from one side of a barrier to the other side of the barrier as defined in claim 1 wherein the transferable torque prevents coupling break-off by providing a spring-flexible relationship between said couplings such that the drive phase provides a one-to-one transfer of torque between said couplings.

6. The apparatus for transferring a torque from one side of a barrier to the other side of the barrier as defined in claim 5 wherein the spring-flexible relationship between said couplings dampens vibrations associated with the transferred torque.

* * * * *